(12) United States Patent
Tsurumaru et al.

(10) Patent No.: US 9,935,473 B2
(45) Date of Patent: Apr. 3, 2018

(54) STORAGE BATTERY SYSTEM

(71) Applicant: TOSHIBA MITSUBISHI-ELECTRIC INDUSTRIAL SYSTEMS CORPORATION, Chuo-ku (JP)

(72) Inventors: Daisuke Tsurumaru, Tokyo (JP); Masato Hanada, Tokyo (JP)

(73) Assignee: TOSHIBA MITSUBISHI-ELECTRIC INDUSTRIAL SYSTEMS CORPORATION, Chuo-ku (JP)

( * ) Notice: Subject to any disclaimer, the term of this patent is extended or adjusted under 35 U.S.C. 154(b) by 107 days.

(21) Appl. No.: 14/915,938

(22) PCT Filed: Sep. 19, 2013

(86) PCT No.: PCT/JP2013/075342
§ 371 (c)(1),
(2) Date: Mar. 2, 2016

(87) PCT Pub. No.: WO2015/040721
PCT Pub. Date: Mar. 26, 2015

(65) Prior Publication Data
US 2016/0204629 A1 Jul. 14, 2016

(51) Int. Cl.
*H02J 7/00* (2006.01)
*H01M 10/46* (2006.01)
(Continued)

(52) U.S. Cl.
CPC .......... *H02J 7/0021* (2013.01); *H01M 10/46* (2013.01); *H01M 10/48* (2013.01); *H02J 3/32* (2013.01);
(Continued)

(58) Field of Classification Search
USPC ................................................ 320/116–123
See application file for complete search history.

(56) References Cited

U.S. PATENT DOCUMENTS

2011/0298626 A1* 12/2011 Fechalos ............. H01M 10/482
340/664
2012/0319657 A1* 12/2012 Ke ........................ H02J 7/0021
320/134
(Continued)

FOREIGN PATENT DOCUMENTS

JP 10-290534 A 10/1998
JP 2012-75243 A 4/2012
(Continued)

OTHER PUBLICATIONS

Office Action dated Apr. 4, 2017 in Japanese Patent Application No. 2015-537507 with partial English translation.
(Continued)

*Primary Examiner* — Binh Tat
(74) *Attorney, Agent, or Firm* — Oblon, McClelland, Maier & Neustadt, L.L.P.

(57) ABSTRACT

A storage battery system connected to a power system and operative based on a charge/discharge request from an EMS includes: a battery management unit configured to monitor a state of the storage battery; a power conditioning system; a control device configured to receive the charge/discharge request and storage battery information supplied from the battery management unit and to control the power conditioning system based thereon; an on-site monitoring and operating device directly connected to the control device, the on-site monitoring and operating device including a display unit configured to display the storage battery information and an operation unit configured to enable an on-site charge/discharge request to the AC-DC converter to be input. The control device includes an on-site request adjustment unit configured to receive the on-site charge/discharge request and the storage battery information and to determine a
(Continued)

charge/discharge command to the power conditioning system based thereon.

5 Claims, 4 Drawing Sheets (51) Int. Cl.
*H01M 10/48* (2006.01)
*H02J 3/32* (2006.01)
*H02J 7/34* (2006.01)
*H01M 10/42* (2006.01)

(52) U.S. Cl.
CPC ............... *H02J 7/007* (2013.01); *H02J 7/34* (2013.01); *H01M 2010/4271* (2013.01); *H01M 2220/10* (2013.01); *H02J 2007/005* (2013.01)

(56) References Cited

U.S. PATENT DOCUMENTS

| 2014/0001863 A1* | 1/2014 | Zhang | G21D 1/02 |
| | | | 307/66 |
| 2014/0015469 A1* | 1/2014 | Beaston | H02J 3/32 |
| | | | 320/101 |

FOREIGN PATENT DOCUMENTS

| JP | 2013-27210 A | 2/2013 |
| JP | 2013-169068 A | 8/2013 |
| JP | 2013-169069 A | 8/2013 |
| WO | 2013/046657 A1 | 4/2013 |

OTHER PUBLICATIONS

International Search Report dated Dec. 17, 2013 in PCT/JP2013/075342 filed Sep. 19, 2013.
Combined Chinese Office Action and Search Report dated Jul. 31, 2017 in Patent Application No. 201380079684.2 (with partial English translation and English translation of categories of cited documents).

* cited by examiner

Storage battery module monitor

Parallel No.01    Serial No.01

State of cells

| | Voltage | Balance discharge | Cell failed | Overcharged | Overdischarged | | |
|---|---|---|---|---|---|---|---|
| Cell 01 | 0 mV | O | O | O | O | O | O |
| Cell 02 | 0 mV | O | O | O | O | O | O |
| Cell 03 | 0 mV | O | O | O | O | O | O |
| Cell 04 | 0 mV | O | O | O | O | O | O |
| Cell 05 | 0 mV | O | O | O | O | O | O |
| Cell 06 | 0 mV | O | O | O | O | O | O |

State of modules

| | TEMP | Abnormal TEMP |
|---|---|---|
| Module 01 | 0 °C | O |

Below operational lower limit voltage
Above operational upper limit voltage

INDIVIDUAL MANAGEMENT

| Operation modes | | |
|---|---|---|
| Mode 1 | Mode 2 | Mode 3 |
| Mode 4 | Mode 5 | Mode 6 |

| Settings | |
|---|---|
| Setting 1 | 100 kW |
| Setting 2 | 100 kW |
| Setting 3 | 0.2 c |
| Setting 4 | 90% |
| Setting 5 | 10% | xxxxxxxxxx yyyyyyyyyy wwwwwwwww aaaaaaaaaa bbbbbbbbbbb cccccc dddddddd

Mode 1: stopping charge/discharge
Mode 2: sleep mode
Mode 3: capacity measuring mode
Mode 4: starting charge and discharge of specified electric power
Mode 5: starting CC-CV charge
Mode 6: starting step-down charge Setting 1: active power charge/discharge amount (P command value)
Setting 2: reactive power charge/discharge amount (Q command value)
Setting 3: charging rate
Setting 4: charge completed SOC setting
Setting 5: discharge completed SOC setting

Fig. 4

Fig. 5

STORAGE BATTERY SYSTEM

TECHNICAL FIELD

The present invention relates to a storage battery system connected to a power system.

BACKGROUND ART

A power system is constructed by connecting a power generation facility and a load facility through a power transmission facility. There are power systems of various scales, ranging from large-scale systems that connect a plurality of large-scale power plants with a large number of plants, commercial establishments and households to small-scale systems constructed in specific facilities. The power systems of all the scales include an energy management system (EMS) that manages electric power supply/demand in the entire power system. The EMS balances electric power supply from the power generation facilities and electric power demand from the load facilities.

A storage battery system is connected to the power system as described above to be used as one means for balancing electric power supply/demand. Although a large amount of electric power was once thought hard to store, mass storage batteries like lithium ion batteries and sodium sulfur batteries, which are now in practical use, make it possible to store a large amount of electric power. By connecting the storage battery system including such storage batteries to the electric power system, it becomes possible to adopt such an operation as to charge the storage batteries with electric power excessively generated when electric power supply exceeds electric power demand and to discharge electric power from the storage batteries to compensate shortage of electric power caused when electric power demand exceeds electric power supply.

One adequate application example of such a storage battery system is a combination of the storage battery system with a power generation facility using energy of nature, such as sunlight and wind force. The power generation facilities using the energy of nature are widely being introduced in response to increased interest in energy issues or environmental issues of these days. However, the power generation facilities using the energy of nature have a disadvantage that natural factors, such as seasons and weather, tend to affect electric power to be generated and hinder stable supply of electric power. The storage battery system can make up for the disadvantage, so that stable electric power supply can be achieved by combining the storage battery system with the power generation facilities using the energy of nature.

When the storage battery system is connected to the power system, the operation of the storage battery system is managed by the above-mentioned EMS. The storage battery system includes a power conditioning system (PCS) connected to the storage battery. The PCS has a function of converting AC power of the power system into DC power and charging the storage battery with the DC power, and a function of converting DC power of the storage battery into AC power and discharging the AC power to the power system. When a charge/discharge request is supplied from the EMS to the PCS, the PCS operates in response to the charge/discharge request. As a result, charge of the storage battery with electric power from the power system or discharge of electric power from the storage battery to the power system is achieved.

The applicant of the present invention recognizes the following literature as related art of the present invention.

FIG. 9 in Patent Literature 1 illustrates one example of a storage battery system connected to the power system.

CITATION LIST

Patent Literature

Patent Literature 1: Japanese Patent Laid-Open No. 2013-27210
Patent Literature 2: Japanese Patent Laid-Open No. 2012-75243

SUMMARY OF INVENTION

Technical Problem

The charge/discharge request supplied from the EMS to the PCS is determined so as to balance electric power supply/demand in the entire power system. However, the determination is not necessarily adequate for the storage battery. Since the EMS executes a huge amount of arithmetic calculation, it is difficult for the EMS to constantly grasp the state of the storage battery which is a recipient of the request and to perform finely-tuned control corresponding to the state. When the storage battery system has a large capacity in particular, the storage battery is constituted of a large number of cells. In a specific example, the storage battery is constituted of hundreds of cells to tens of thousands of cells. Accordingly, it is quite difficult to constantly grasp the states of all these cells. As a result, when the EMS manages individual storage batteries, the EMS needs a long cycle for controlling the storage battery system to cope with the ever-changing states of the storage batteries. As a result, the charge/discharge request supplied from the EMS fails to be a proper request corresponding to the states of the storage batteries. Depending on the relation between the charge/discharge request and the states of the storage batteries, not only the storage batteries may insufficiently be used, but also the storage batteries may be overused to the extent that the performance and lives of the storage batteries are affected.

In view of such circumstances, when the PCS is directly operated on a site where the storage battery system is installed, independently of the charge/discharge request from the EMS, it is necessary to perform charge/discharge operation while confirming the states of the storage batteries. However, performing proper operation corresponding to change in the states (voltage change, temperature change) of the storage batteries requires highly-skilled operators, which tends to cause human errors.

The present invention has been made in view of the above-mentioned problem, and it is therefore an object of the present invention to provide a storage battery system that enables an on-site operator to perform charge/discharge operation without human errors.

Solution to Problem

In order to accomplish the above object, a storage battery system according to the present invention is configured as described below.

The storage battery system according to the present invention is connected to a power system and is configured to operate based on a charge/discharge request from an energy management system that manages electric power supply/demand of the power system. There is no limitation on the scale and configuration of the power system to be connected to the storage battery system according to the present invention.

The storage battery system according to the present invention includes a storage battery, a battery management unit, a power conditioning system, a control device, and an on-site monitoring and operating device. The storage battery may be constituted of a single storage battery cell, or may be constituted as an assembly of a plurality of storage battery cells. As for the type of storage battery, a mass storage battery such as a lithium ion battery, a sodium sulfur battery, and a nickel-hydrogen battery is preferable.

The battery management unit is configured to monitor the state of the storage battery. The battery management unit monitors the state quantity of monitoring items such as current, voltage, and temperature. As for the voltage, when the storage battery is constituted of a plurality of cells, the voltage of each cell is preferably monitored. The battery management unit measures the state quantity of the monitoring items with sensors on a constant basis or at a specified cycle, and outputs some or all of the obtained data to the outside as storage battery information.

The power conditioning system is configured to connect the storage battery to the power system. The power conditioning system has a function of converting AC power of the power system into DC power and charging the storage battery with the DC power and a function of converting DC power of the storage battery into AC power and discharging the AC power to the power system. The power conditioning system is also called a power conditioner, which regulates the amount of electric power for charging the storage battery and the amount of electric power discharged from the storage battery.

The control device is a device interposed between the energy management system and the power conditioning system. The control device receives the charge/discharge request supplied from the energy management system to the storage battery system. The control device is configured to receive, together with the charge/discharge request, the storage battery information supplied from the battery management unit and to control the power conditioning system based on the charge/discharge request and the storage battery information.

An on-site monitoring and operating device is directly connected to the control device. The on-site monitoring and operating device has a display unit and an operation unit. The display unit is configured to display the storage battery information that the control unit receives from the battery management unit. When the storage battery is a storage battery module formed with a plurality of cells arranged in series, the display unit is configured to display voltage states of the respective cells of the storage battery module and a temperature state of the storage battery module based on the storage battery information.

The operation unit is configured to enable an on-site charge/discharge request to the power conditioning system to be input. The on-site charge/discharge request is a charge/discharge request set by an operator on the site where the storage battery system is installed. The operator can use the operation unit to set values of the parameters of the on-site charge/discharge request, the parameters being identical to those of the charge/discharge request from the energy management system.

The control device includes an on-site request adjustment unit. The on-site request adjustment unit is configured to receive the on-site charge/discharge request and the storage battery information and to determine a charge/discharge command to the power conditioning system based on the on-site charge/discharge request and the storage battery information. The on-site request adjustment unit is preferably configured to calculate chargeable/dischargeable electric power based on the storage battery information and to determine a charge/discharge command to the power conditioning system based on the on-site charge/discharge request by using the chargeable/dischargeable electric power as a constraint condition. The chargeable/dischargeable electric power may be calculated based on the voltage of the storage battery. The voltage of the storage battery is included in the storage battery information supplied from the battery management unit. Of course, it is possible to refer to information other than the voltage information in calculation of the chargeable/dischargeable electric power.

In another preferable aspect of the storage battery system according to the present invention, the control device may further include an interlock processing unit. The interlock processing unit is configured to perform interlock processing upon detection of abnormality of the storage battery system, the interlock processing corresponding to a content of the detected abnormality. The abnormality of the storage battery system is detectable, for example, from the storage battery information supplied from the battery management unit. In detection of the abnormality of the storage battery system, it is, of course, possible to refer to information other than the storage battery information, such as information from the power conditioning system.

Advantageous Effects of Invention

The storage battery system according to the present invention enables an operator to monitor the state of the storage battery and to perform charge/discharge operation on the site where the storage battery system is installed. The storage battery system according to the present invention makes it possible to avid human errors since a charge/discharge command to the power conditioning system is determined based on the storage battery information and an on-site charge/discharge request. Therefore, the storage battery system according to the present invention enables an operator on site to perform the charge/discharge operation without human errors.

DESCRIPTION OF EMBODIMENT

Hereinafter, an embodiment of the present invention will be described in detail with reference to the drawings. It is to be noted that like component members are designated by like reference signs to omit redundant description.

First Embodiment

Overall Configuration of First Embodiment

Figure 1:
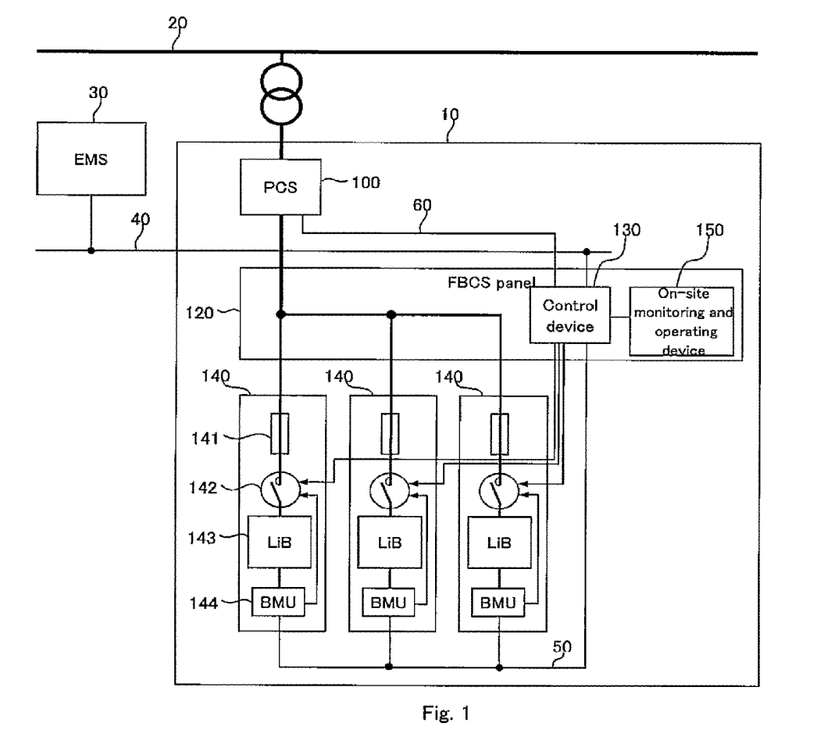
FIG. 1 is a conceptual block diagram for describing the system configuration according to a first embodiment of the present invention.

FIG. 1 is a conceptual block diagram for describing the system configuration according to a first embodiment of the present invention. A storage battery system 10 illustrated in FIG. 1 is connected to a power transmission facility 20 of a power system. The power system includes, in addition to the power transmission facility 20, a power generation facility (illustration omitted) connected to the power transmission facility 20, and a load facility (illustration omitted) connected to the power transmission facility 20. The storage battery system 10 is connected to an energy management system (hereinafter referred to as EMS) 30 present in the distant through a computer network 40. The EMS 30 manages electric power supply/demand of the power system, such as the power generation amount of the power generation facility, the charge/discharge amount of the storage battery system 10, and the power reception amount of the load facility.

The storage battery system 10 includes a power conditioning system (hereinafter referred to as PCS) 100, a front battery control station panel (hereinafter referred to as FBCS panel) 120, and storage battery panels 140. In the storage battery system 10, one PCS 100 is connected to one FBCS panel 120, and the one FBCS panel 120 is connected a plurality of storage battery panels 140 in parallel. Although three rows of storage battery panels 140 are provided in FIG. 1, this configuration is merely an example. The number of the storage battery panels 140 arranged in parallel is determined based on the specification of the PCS 100. Therefore, only one storage battery panel 140 may be provided in parallel. Although the storage battery system 10 has one PCS 100 in FIG. 1, this configuration is also merely an example. The number of the PCSs 100 arranged in parallel is determined based on the specification of the storage battery system 10. Therefore, the number of the PCSs 100 in parallel may be two or more.

(Storage Battery Panel)

The storage battery panel 140 includes a fuse 141, a contactor 142, a storage battery module 143, and a battery management unit (hereinafter referred to as BMU 144). The storage battery module 143 is a module constituted of a plurality of cells connected in series. Each cell is a lithium ion battery (LiB). The storage battery module 143 is connected to the FBCS panel 120 via the contactor 142 and the fuse 141 and through a power transmission line. The storage battery module 143 is also connected to the BMU 144 through a signal line. The BMU 144 is connected to the control device 130 on the FBCS panel 120 through a computer network 50, and to the contactor 142 through the signal line.

The BMU 144 monitors the state of the storage battery module 143. Specifically, the BMU 144 includes a current sensor (illustration omitted), a voltage sensor (illustration omitted), and a temperature sensor (illustration omitted) as means for measuring the state quantities of the storage battery module 143. The current sensor measures current passing through the storage battery module 143. The voltage sensor is provided for each cell to measure the voltage of each cell. The temperature sensor measures the temperature of the storage battery module 143. These sensors do not necessarily have to be provided inside the casing of the BMU 144. These sensors attached to the storage battery module 143 and the BMU 144 may be connected through the signal line. The storage battery module 143 is constantly monitored by the BMU 144. However, the constant monitoring described in the present embodiment is a concept including not only the operation of taking in continuous signals without an intermission from the sensors but also the operation of taking in the signals of the sensors at a specified short cycle. The BMU 144 transmits to the control device 130 storage battery information including the information obtained by measurement performed by each sensor.

The contactor 142 is disposed between the fuse 141 and the storage battery module 143. Upon reception of an ON signal, a point of contact of the contactor 142 is set to ON and so the contactor 142 is turned on. Upon reception of an OFF signal, the point of contact is set to OFF and so the contactor 142 is turned off. For example, the ON signal is a current of more than a specified value [A], and the OFF signal is a current of less than the specified value [A]. When the contactor 142 is turned on, the PCS 100 and the storage battery module 143 are electrically connected, and when the contactor 142 is turned off, the PCS 100 and the storage battery module 143 are electrically disconnected.

(FBCS Panel)

The FBCS panel 120 is connected to the storage battery panels 140 and the PCS 100. Specifically, the storage battery panels 140 are each connected to the FBCS panel 120 through individual power transmission lines. The individual power transmission lines converge inside the FBCS panel and are connected to a thicker power transmission line. The converged power transmission line is connected to the PCS 100. The FBCS panel 120 also includes the control device 130. The control device 130 includes memories including a ROM and a RAM for example, an input/output interface for inputting and outputting a variety of information, and a processor that can execute various arithmetic processes based on the variety of information. The control device 130 is connected to the EMS 30 through the computer network 40, to the BMU 144 through the computer network 50, and to the PCS 100 through a computer network 60. The control device 130 is connected to the contactor 142 through the signal line.

The control device 130 plays the role of a commander that issues a charge/discharge command to the PCS 100. In one example, the control device 130 receives a charge/discharge request transmitted from the EMS 30 and storage battery information transmitted from the BMU 144. The charge/discharge request includes a request with respect to active power and reactive power charged and discharged by the PCS 100. The charge/discharge request includes a specific request numerically indicating a specific electric power amount, and an abstract request requesting maximum charge/discharge power. The control device 130 determines a charge/discharge command (equivalent to a charge/discharge amount [kW]) to be issued to the PCS 100 based on the charge/discharge request and the storage battery information, and transmits the command to the PCS 100. The control device 130 also includes functions such as a function of safely controlling the performance and life of the storage battery module 143 to the maximum, a function of outputting a trip signal to the PCS 100, and a function of turning on and off the contactor 142.

(PCS)

The PCS 100 is connected to the power transmission facility 20 via a transformer and through the power transmission line. The PCS 100 has a charging function of converting AC power of the power system into DC power and charging the storage battery module 143 with the DC power, and a discharging function of converting DC power of the storage battery module 143 into AC power and discharging the AC power to the power system. The amount of electric power to charge the storage battery module 143 and the amount of electric power discharged from the storage battery module 143 are adjusted by the PCS 100. Regulation of the charge/discharge electric power amount by the PCS 100 is performed in accordance with the charge/discharge command supplied from the control device 130. The PCS 100 includes a current sensor (illustration omitted) and a voltage sensor (illustration omitted), and the PCS 100 adjusts the charge/discharge electric power amount with reference to the output values of these sensors.

Characteristic Configuration of First Embodiment

Figure 2:
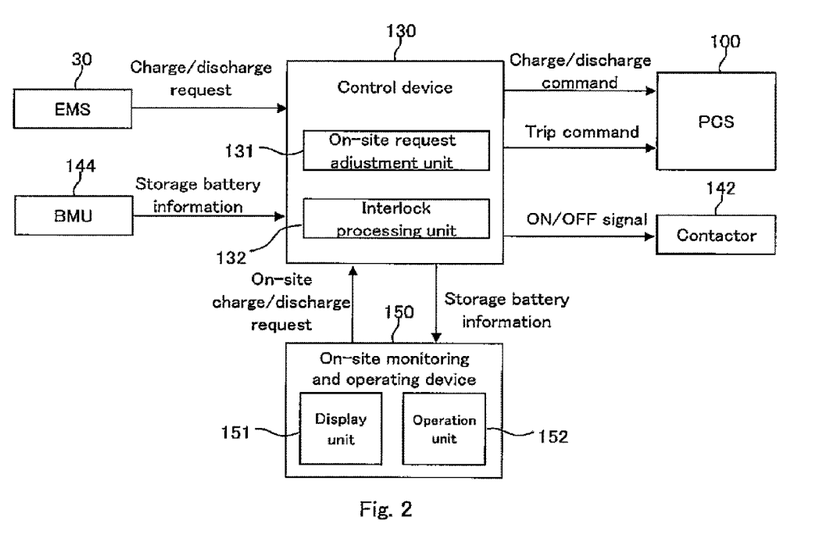
FIG. 2 is a block diagram of the system according to the first embodiment of the present invention.

FIG. 2 is a block diagram of the system according to the first embodiment of the present invention. In FIG. 2, a block representing the control device 130 contains blocks representing some of various functions included in the control device 130. An arithmetic resource is assigned to each of these blocks. Programs corresponding to the respective blocks are prepared for the control device 130, and these programs are executed by the processor, so that the functions of the respective blocks are implemented in the control device 130.

The control device 130 receives a charge/discharge request from the EMS 30, and receives storage battery information from the BMU 144. The control device 130 determines a charge/discharge command based on the charge/discharge request and the storage battery information, and transmits the charge/discharge command to the PCS 100.

(Interlock Function)

The control device 130 also has an interlock function, which is implemented by the interlock processing unit 132. Interlocking of the storage battery module 143 is performed also by the BMU 144 when the BMU 144 detects overdischarge, overcharge, abnormal temperature, and the like. However, by the time when such abnormality occurs, the storage battery is already in a considerably overloaded state. Accordingly, in the system of the present embodiment, the PCS 100 and the contactor 142 are controlled by a software interlock mechanism before the BMU 144 interlocks the module 143. The interlock processing unit 132 performs interlock processing upon detection of abnormality of the storage battery system 10, the interlock processing corresponding to a content of the detected abnormality. Specifically, the interlock processing refers to the processing of outputting a trip signal to the PCS 100 and/or turning on the contactor 142. In order to execute the interlock processing before the BMU 144 performs the interlock processing, interlock threshold values, such as current, voltage, and temperature, are set lower than the threshold values set by the BMU 144.

(On-Site Monitoring and Operating Function)

The system of the present embodiment further has an on-site monitoring and operating function, which is implemented by an on-site monitoring and operating device 150 and an on-site request adjustment unit 131. The on-site monitoring and operating device 150 includes a display unit 151 configured to receive storage battery information from the control device 130 and to display the storage battery information. The on-site monitoring and operating device 150 also includes an operation unit 152 configured to enable an on-site charge/discharge request to the PCS 100 to be input. The on-site charge/discharge request is transmitted to the control device 130. The control device 130 includes the on-site request adjustment unit 131. The on-site request adjustment unit 131 determines a charge/discharge command to the PCS 100 based on the on-site charge/discharge request and the storage battery information.

Specifically, the on-site request adjustment unit 131 calculates chargeable/dischargeable electric power based on the storage battery information and determines a charge/discharge command to the PCS 100 based on the on-site charge/discharge request by using the chargeable/dischargeable electric power as a constraint condition. In the case where the on-site charge/discharge request is a specific request that specifically specifies the charge electric power amount, the requested charge electric power amount is determined as a charge/discharge command (charge command) if the requested charge electric power amount is equal to or less than chargeable electric power. If the requested charge electric power amount is larger than the chargeable electric power, the chargeable electric power is determined as a charge/discharge command (charge command). In the case where the on-site charge/discharge request is a specific request that specifically specifies the discharge electric power amount, the requested discharge electric power amount is determined as an electric charge/discharge command (discharge command) if the requested discharge electric power amount is equal to or less than dischargeable electric power. If the requested discharge electric power amount is larger than dischargeable electric power, the dischargeable electric power is determined as a charge/discharge command (discharge command).

A more specific description is given of the on-site monitoring and operating device 150. The on-site monitoring and operating device 150 is assembled on the FBCS panel 120, or is provided in the vicinity of the FBCS panel. For example, the on-site monitoring and operating device 150 is directly connected with the control device 130 through a network cable.

The on-site monitoring and operating device 150 includes a screen. The display unit 151 receives the storage battery information, which is supplied from the battery management unit 144 to the control device 130, via the control device 130, and displays the information on the screen. The operation unit 152 includes an input device, such as a keyboard, a mouse, and a touch panel. The operation unit 152 transmits to the control device 130 setting values input by an on-site operator as an on-site charge/discharge request.

Figure 3:
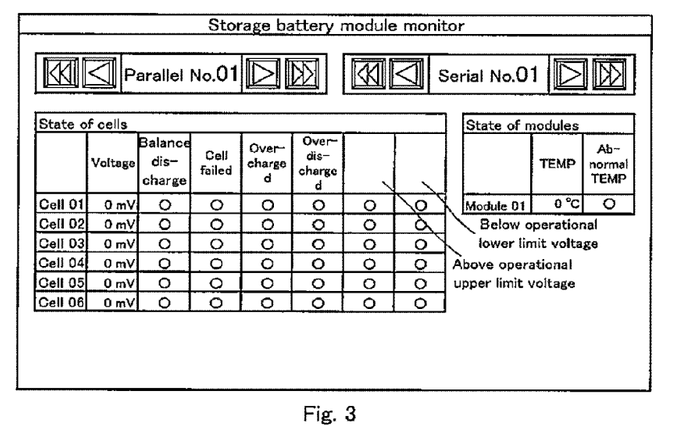
FIG. 3 is a schematic view illustrating one example of the screen displayed by the display unit, the screen being a monitor screen that displays the state of the storage battery module.

FIG. 3 is a schematic view illustrating one example of the screen displayed by the display unit 151, the screen being a monitor screen that displays the state of the storage battery module 143. The display unit 151 displays the state of each cell of the storage battery module 143 on the monitor screen. The voltage of each cell is displayed on the monitor screen. In addition, when the state of each cell matches any of the state items including balance discharge in progress, failed, overcharged, overdischarged, above operational upper limit voltage, and below operational lower limit voltage, the matched state item of each cell is also indicated.

The display unit 151 also displays the state of the storage battery module 143 on the monitor screen. In addition to the module temperature of the storage battery module 143, the abnormal state of the storage battery module 143 is also indicated on the monitor screen if the module temperature reaches an abnormal value.

Figure 4:
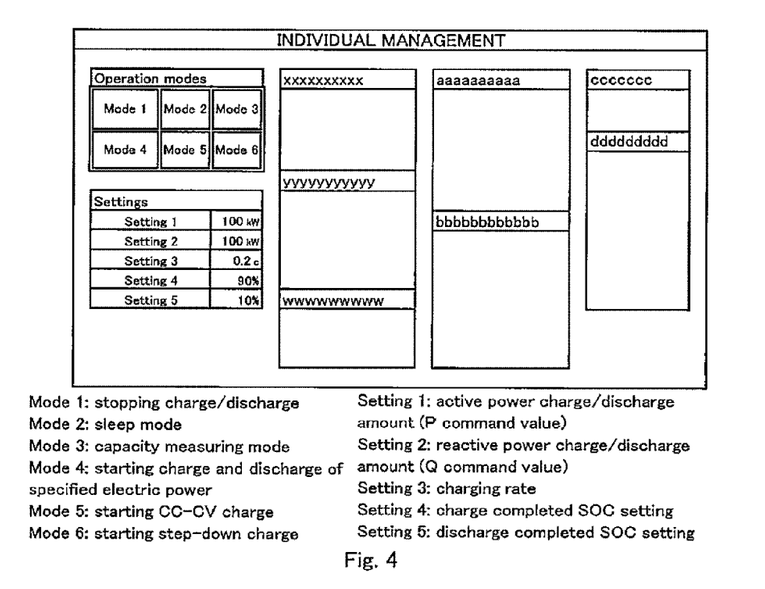
FIG. 4 is a schematic view of the operation screen operated by the on-site operator.

FIG. 4 is a schematic view of the operation screen operated by the on-site operator. The operation screen includes input fields to which numerical values can be input. On the operation screen illustrated in FIG. 4, setting 1 (active power charge/discharge amount (P command value)), setting 2 (reactive power charge/discharge amount (Q command value)), setting 3 (charging rate), setting 4 (charge completed SOC setting), and the setting 5 (discharge completed SOC setting) can be input, respectively.

The operation screen also includes a button to select an operation mode. On the operation screen illustrated in FIG. 4, any one of the operation modes can be selected from a mode 1 (stopping charge/discharge), a mode 2 (sleep mode), a mode 3 (capacity measuring mode), a mode 4 (starting charge/discharge of specified electric power), a mode 5 (starting CC-CV charge), and a mode 6 (starting step-down charge). It is to be noted that the CC charge is constant-current charge and the CV charge is constant voltage charge.

By using the on-site monitoring and operating device 150, the on-site operator can manually transmit the charge/discharge request (on-site charge/discharge request) to the PCS 100 without depending on the charge/discharge request from the EMS 30. Specifically, when the on-site operator uses an input device of the operation unit 152 to input various setting values into the input fields and then select the mode 4 (starting charge/discharge of specified electric power), the on-site monitoring and operating device 150 transmits an on-site charge/discharge request to the control device 130.

(Flow Chart)

Figure 5:
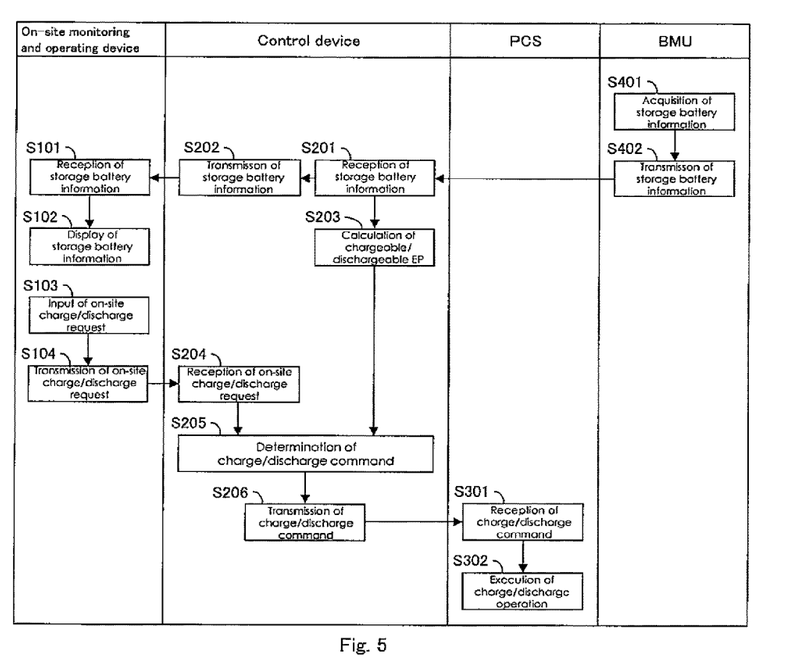
FIG. 5 is a flow chart of a control routine executed by the storage battery system.

FIG. 5 is a flow chart of a control routine executed by the storage battery system 10 to implement charge/discharge control based on the operation by the on-site operator. The memory of the control device 130 stores programs for executing the processing of the flow chart illustrated in FIG. 5. When the processor of the control device 130 reads and executes the programs, the processing illustrated in FIG. 5 is implemented.

In the routine illustrated in FIG. 5, the BMU 144 first acquires storage battery information on the constant basis by using the various sensors described before (step S401). The storage battery information includes the current passing through the storage battery module 143, the voltage of each cell, and the temperature of the storage battery module 143. Then, the BMU 144 transmits the acquired storage battery information to the control device 130 (step S402).

The control device 130 receives the storage battery information transmitted from the BMU 144 (step S201). Then, the control device 130 transmits the received storage battery information to the on-site monitoring and operating device 150 (step S202). The on-site monitoring and operating device 150 receives the storage battery information transmitted from the control device 130 (step S101). The on-site monitoring and operating device 150 displays the storage battery information (step S102). Specifically, the display unit 151 displays the storage battery information on the screen. For example, the display unit 151 displays the state of each cell of the storage battery module 143 on the monitor screen illustrated in FIG. 3.

The on-site operator operates the operation unit 152 of the on-site monitoring and operating device 150 to input an on-site charge/discharge request to the PCS 100 (step S103). Specifically, the on-site operator uses an input device of the operation unit 152 to input various setting values into the input fields illustrated in FIG. 4 and then selects an operation mode (starting charge/discharge of specified electric power) illustrated in FIG. 4. The on-site monitoring and operating device 150 transmits to the control device 130 the setting values input by the on-site operator as an on-site charge/discharge request (step S104).

The control device 130 receives the on-site charge/discharge request transmitted from the on-site monitoring and operating device 150 (step S204). The control device 130 (on-site request adjustment unit 131) also calculates chargeable/dischargeable electric power based on the storage battery information received in step S201 (step S203). The chargeable/dischargeable electric power is re-calculated in the control device 130 whenever the storage battery information is acquired in step S401 and the storage battery information is transmitted from the BMU 144 to the control device 130.

The control device 130 (on-site request adjustment unit 131) determines the charge/discharge command to the PCS 100 based on the on-site charge/discharge request received in step S204 by using the chargeable/dischargeable electric power calculated in step S203 as a constraint condition (step S205). The method for determining the charge/discharge command to be executed in step S205 is as stated in the description of the on-site monitoring operating function. Then, the control device 130 transmits the charge/discharge command to the PCS 100 (step S206).

The PCS 100 receives the charge/discharge command transmitted from the control device 130 (step S301). The PCS 100 executes charge/discharge operation in accordance with the charge/discharge command (step S302).

Since the storage battery system 10 of the present embodiment includes the on-site monitoring and operating device 150 as described before, the operator can monitor the state of the storage battery on site. In addition, the operator can issue the on-site charge/discharge request to the PCS 100 on site without depending on the charge/discharge request from the EMS 30.

Particularly, the storage battery system 10 of the present embodiment does not operate the PCS 100 as directed by the on-site charge/discharge request input by the on-site operator. The storage battery system 10 of the present embodiment operates the PCS 100 in accordance with the charge/discharge command determined by the control device 130. The control device 130 (on-site request adjustment unit 131) determines the charge/discharge command to the PCS 100 based on the on-site charge/discharge request by using the chargeable/dischargeable electric power calculated based on the storage battery information as a constraint condition. Accordingly, when the on-site charge/discharge request exceeds the chargeable/dischargeable electric power of the storage battery, a charge/discharge command of a suppressed charge/discharge amount is determined. This makes it possible to control the request from the operator depending on the state of the storage battery and to thereby avoid human errors.

Furthermore, the on-site request adjustment unit 131 re-calculates chargeable/dischargeable electric power whenever the storage battery information is acquired, so that the latest chargeable/dischargeable electric power is calculated. Accordingly, even in the case where the on-site operator fails to notice change in voltage or temperature and makes an on-site charge/discharge request exceeding the chargeable/dischargeable electric power of the storage battery, a charge/discharge command, which satisfies the constraint condition equivalent to the latest chargeable/dischargeable electric power, can still be determined. Accordingly, human errors can be avoided.

Although the control device 130 is placed on the FBCS panel 120 in the system of the first embodiment described in the foregoing, the placement position of the control device 130 is not limited thereto. For example, the control device 130 may be placed in the PCS 100, the storage battery panel 140, or in any one of the BMUs 144. Moreover, various functions mounted on the control device 130 may be mounted on the PCS 100, and be installed in the PCS 100.

These various functions may also be installed in the storage battery panel 140 and on the BMUs 144.

REFERENCE SIGNS LIST

10 Storage battery system
20 power transmission facility
30 Energy management system (EMS)
40, 50, 60 Computer network
100 Power conditioning system (PCS)
120 FBCS panel
130 Control device
131 On-site request adjustment unit
132 Interlock processing unit
140 Storage battery panel
141 Fuse
142 Contactor
143 Storage battery module
144 Battery management unit (BMU)
150 On-site monitoring and operating device
151 Display unit
152 Operation unit

The invention claimed is:

1. A storage battery system connected to a power system and operative based on a charge/discharge request from an energy management system that manages electric power supply/demand of the power system, the storage battery system comprising:
a storage battery;
battery management circuitry configured to monitor a state of the storage battery;
a power conditioning system configured to convert AC power of the power system into DC power and charge the storage battery with the DC power and to convert DC power of the storage battery into AC power and discharge the AC power to the power system;
control circuitry configured to receive the charge/discharge request from the energy management system that manages electric power supply/demand of the power system and receive storage battery information supplied from the battery management circuitry and to control the power conditioning system based on the charge/discharge request and the storage battery information; and
an on-site monitoring and operating device directly connected to the control device, the on-site monitoring and operating device including a display configured to display the storage battery information and operation circuitry configured to enable an on-site charge/discharge request to the power conditioning system to be input, wherein
the control circuitry further includes on-site request adjustment circuitry configured to receive the on-site charge/discharge request and the storage battery information and to determine a charge/discharge command to the power conditioning system based on the on-site charge/discharge request and the storage battery information, and
wherein the control circuitry is configured to override specific values of the charge/discharge request or the on-site charge/discharge request when determining the charge/discharge command to the power conditioning system.

2. The storage battery system according to claim 1, wherein
the control circuitry is further configured to perform interlock processing upon detection of abnormality of the storage battery system, the interlock processing corresponding to a content of the detected abnormality.

3. The storage battery system according to claim 1, wherein
the on-site request adjustment circuitry calculates chargeable/dischargeable electric power based on the storage battery information and determines a charge/discharge command to the power conditioning system based on the on-site charge/discharge request by using the chargeable/dischargeable electric power as a constraint condition.

4. The storage battery system according to claim 1, wherein
the battery management circuitry monitors the state of the storage battery on a constant basis.

5. The storage battery system according to claim 1, wherein
the storage battery is formed with a plurality of cells arranged in series, and
the display displays voltage states of the respective cells of the storage battery, and a temperature state of the storage battery based on the storage battery information.

* * * * *